United States Patent
Flynt et al.

(10) Patent No.: US 7,502,606 B2
(45) Date of Patent: Mar. 10, 2009

(54) COMPUTER-READABLE MEDIUM, METHOD, AND DEVICE FOR ASSOCIATING INFORMATION WITH A CONTACT

(75) Inventors: David Wayne Flynt, Lake Forest Park, WA (US); Autumn Lee Stroupe, North Bend, WA (US); Marc W. Todd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 11/102,948

(22) Filed: Apr. 11, 2005

(65) Prior Publication Data

US 2006/0229097 A1  Oct. 12, 2006

(51) Int. Cl.
*H04Q 7/22* (2006.01)
*H04M 1/00* (2006.01)
(52) U.S. Cl. ............... 455/403; 455/412.1; 455/556.2; 709/219
(58) Field of Classification Search ...... 455/412.1–413, 455/466, 556.1–556.2, 566; 707/3, 100; 709/217–222, 226
See application file for complete search history.

(56) References Cited

U.S. PATENT DOCUMENTS 7,117,445 B2 * 10/2006 Berger ................. 715/752
2002/0068551 A1 * 6/2002 Strunk et al. ............... 455/414
2002/0073207 A1 * 6/2002 Widger et al. ............. 709/227
2002/0082054 A1 * 6/2002 Keinonen et al. ........... 455/567
2004/0015699 A1 * 1/2004 Thomas et al. ............. 713/179
2004/0070627 A1 * 4/2004 Shahine et al. ............. 345/794
2004/0266397 A1 * 12/2004 Smith et al. ............. 455/412.1
2005/0004928 A1 * 1/2005 Hamer et al. ............... 707/100
2005/0065980 A1 * 3/2005 Hyatt et al. ............. 707/104.1
2005/0130641 A1 * 6/2005 Lorraine Scott ............. 455/418
2006/0030368 A1 * 2/2006 Soelberg ................. 455/566
2006/0068816 A1 * 3/2006 Pelaez et al. ............... 455/466
2006/0116139 A1 * 6/2006 Appelman ................. 455/466
2006/0135142 A1 * 6/2006 Repka ................. 455/418
2006/0212489 A1 * 9/2006 Eggers ................. 707/201
2006/0242210 A1 * 10/2006 Ring et al. ................. 707/204

* cited by examiner

*Primary Examiner*—Simon D Nguyen
(74) *Attorney, Agent, or Firm*—Merchant & Gould; Ryan T. Grace

(57) ABSTRACT

A method, computer-readable medium, and a computing device are provided for associating one or more data objects and other information with one or more contacts. In certain embodiments, an association application operates to access, analyze, and associate one or more data objects and other information with one or more contacts. A user may then examine a contact and utilize data objects and other information associated with the particular contact. Thus, a user can think about information as it relates to a contact, rather than the information type or application that the information relates. The user can now go to one location where information is compiled with respect to a specific contact.

20 Claims, 10 Drawing Sheets

COMPUTER-READABLE MEDIUM, METHOD, AND DEVICE FOR ASSOCIATING INFORMATION WITH A CONTACT

BACKGROUND OF THE INVENTION

As society moves forward, mobile devices, such as mobile telephones, smart phones, personal data assistants (PDAs), etc. are being used and depended upon more and more in everyday life. Today, it is not uncommon for a person to have a mobile telephone, PDA, laptop, and a personal computer. These devices typically include one or more applications which allow a user to send/receive e-mail, draft documents, maintain contacts, maintain schedules, organize finances, etc. The portability and usability of these mobile devices allow a user to perform many tasks which tends to promote greater efficiency and productivity.

However, while mobile computing devices have changed many lives for the better, there are some drawbacks, partly due to the limited screen size or viewable area that a user is able to see when using the device and the large amount of data and applications that can be stored on the devices. For example, due to the large number of available applications on a mobile device, it can be tedious for a user to find certain data that may not be available through one or more applications that the user is currently using. The user is typically dependent on a particular application to find and use data associated therewith. Searching through multiple applications and lists of data items stored on the mobile device can be cumbersome due to interaction and other constraints, which tends to lead to inefficiencies and repetitive actions.

For example, suppose a user wishes to access an e-mail from a specific person. The user must first locate and open the particular e-mail application on the mobile device. Next, the user needs to find the e-mail of interest, which may include trying to recall when the e-mail was received, the subject matter, and maybe other recipients included on the e-mail. While some e-mail applications include a keyword search function, it tends to be an inefficient and cumbersome process. Likewise, if a user would like to review details of a meeting, the user must first locate and open the calendar or scheduling application. After locating and opening the application, the user now has to manually look at each meeting until locating the desired meeting. Additionally, as briefly stated above, the display or viewing area associated with many mobile devices tends to be limited based on the size of the device itself. Thus, it is difficult to use and view information associated with multiple applications at the same time without opening and using each application independently of one another.

It is with respect to these considerations and others that the various embodiments of the present invention have been made.

SUMMARY OF THE INVENTION

Aspects of the invention provide a means for associating one or more data objects and other information with one or more contacts. In certain embodiments, an association application operates to access, analyze, and associate one or more data objects and other information with one or more contacts. A user may then examine a contact and view or select data objects and other information associated with a particular contact. Thus, a user can think about information as it relates to a contact, rather than the information type or application that the information relates. The user can now go to one location where information is compiled with respect to a specific contact. In a preferred embodiment, the location is a contact card associated with an individual or business.

Aspects of the invention enable a user to access data objects and other information such as: e-mail, calendar events, call history, documents, photos, video etc. from a contact card of a contact. Thus, to see information related to a particular contact, a user only needs to open the particular contact's contact card, using a soft key, for example. The contact card provides an access point to data objects and other information associated with a particular contact. Aspects of the invention tend to minimize the amount of physical interaction with applications and lists required to find information on a computing device.

The invention may be implemented as a computer process or method, a computing apparatus, or as an article of manufacture such as a computer program product or computer readable media. The computer program product may be a computer storage media readable by a computer system and encoding a computer program of instructions for executing a computer process. The computer program product may also be readable by a computing system and encoding a computer program of instructions for executing a computer process. These and various other features, as well as advantages, which characterize the present invention, will be apparent from a reading of the following detailed description and a review of the associated drawings.

DETAILED DESCRIPTION OF THE PREFERRED EMBODIMENT

Figure 1:
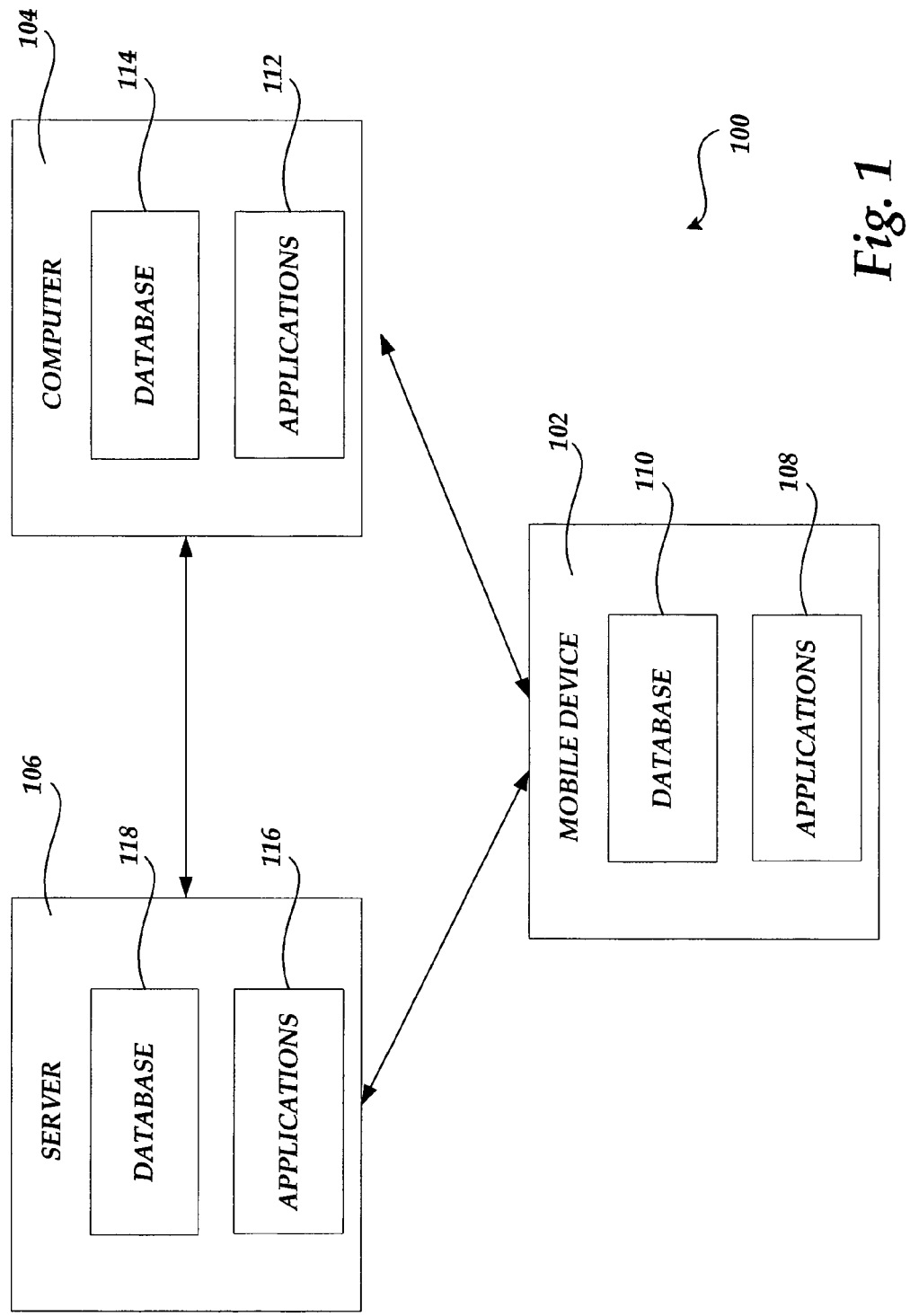
FIG. 1 is a block diagram depicting an exemplary computing environment for implementation of various embodiments of the present invention.

The present invention is described in the context of mobile devices, such as personal data assistants (PDAs), cellphones, pagers, smart phones, camera phones, etc. Embodiments of the present invention operate to improve a user's ability to access data objects and other information associated with one or more contacts while using a computing device, such as a mobile computing device for example. While various embodiments are described in the context of mobile computing devices, it will be appreciated that the invention is not limited to mobile computing devices and is generally extendable to other computing devices, such as server, portable, laptop, and desktop computers.

Referring now to the drawings, in which like numerals represent like elements, various aspects of the present invention will be described. In particular, FIGS. 1-3 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices.

Communication media typically embodies computer readable instructions, data structures, program modules or other data in a modulated data signal such as a transport mechanism and includes any information delivery media. "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

Operating Environment

The exemplary operating environments shown and described herein are only examples of suitable operating environments and are not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an exemplary operating environment 100 for the present invention. As depicted, the exemplary operating environment 100 includes a mobile computing device or mobile device 102, a computer 104, and a server 106. Exemplary mobile devices 102 include mobile telephones or cellphones, PDAs, and other mobile devices capable of operating one or more applications 108, including one or more database applications 110, described below. The computer 104 may be a desktop or other personal computer (PC). The computer 104 also includes a number of applications application 112, including one or more database applications 114. The server computer 106 also includes a number of applications application 116, including one or more database applications 118. As shown in FIG. 1, the mobile device 102, computer 104, and the server 106 are in communication with one another. The communication means can be wireless or wireline, or a combination of the two. It will also be appreciated that greater or fewer computing devices may be in communication with one another. For example, the mobile device 102 can be in communication with one or more mobile devices which may also be in communication with server 106 and/or computer 104.

Figure 2:
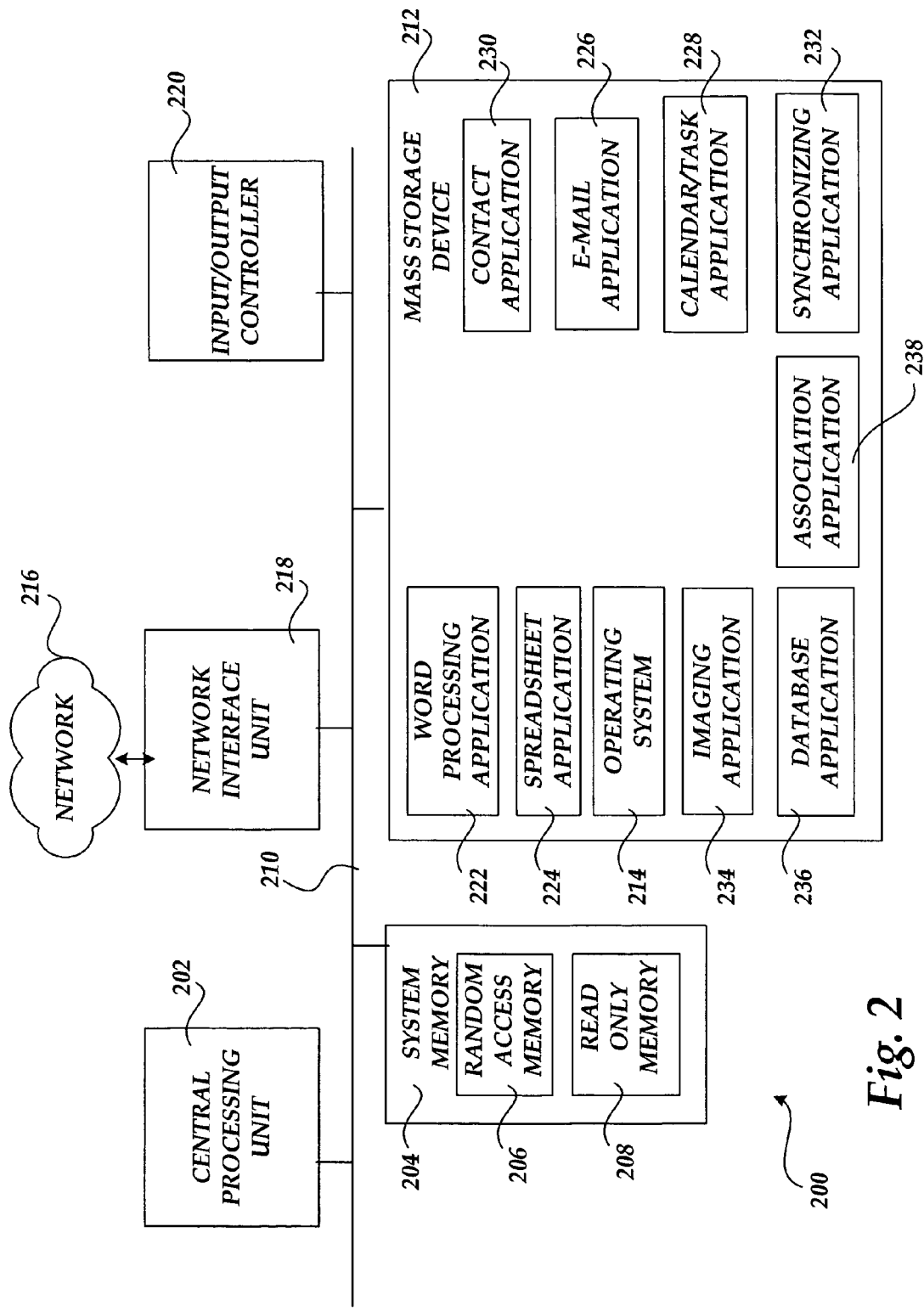
FIG. 2 is a block diagram depicting an exemplary computing device for implementation of various embodiments of the present invention.

Referring now to FIG. 2 an exemplary computer 200 comprises a desktop, laptop, server, or other type of computer capable of executing one or more application programs. The computing architecture includes a central processing unit 202 ("CPU"), a system memory 204, including a random access memory 206 ("RAM") and a read-only memory ("ROM") 208, and a system bus 210 that couples the memory to the CPU 202. A basic input/output system containing the basic routines that help to transfer information between elements within the computer, such as during startup, is stored in the ROM 208. The computer 200 further includes a mass storage device 212 for storing an operating system 214, application programs, and other program modules, which will be described in greater detail below.

The mass storage device 212 is connected to the CPU 202 through a mass storage controller (not shown) connected to the bus 210. The mass storage device 212 and its associated computer-readable media provide non-volatile storage for the computer 200. Although the description of computer-readable media contained herein refers to a mass storage device, such as a hard disk or CD-ROM drive, it should be appreciated by those skilled in the art that computer-readable media can be any available media that can be accessed by the computer 200.

According to various embodiments of the invention, the computer 200 may operate in a networked environment using logical connections to remote computers through a TCP/IP or other network 216, such as the Internet. The computer 200 may connect to the network 216 through a network interface unit 218 connected to the bus 210. It should be appreciated that the network interface unit 218 may also be utilized to connect to other types of networks and remote computer systems, such as mobile device 102. The computer 200 may also include an input/output controller 220 for receiving and processing input from a number of other devices, including a keyboard, mouse, or electronic stylus or pen (not shown in FIG. 2). Similarly, an input/output controller 220 may provide output to a display screen, a printer, or other type of output device.

As mentioned briefly above, a number of program modules and data files may be stored in the mass storage device 212 and RAM 206 of the computer 200, including an operating system 214 suitable for controlling the operation of a networked personal computer, such as the WINDOWS XP operating system from MICROSOFT CORPORATION of Redmond, Wash. The mass storage device 212 and RAM 206 may also store one or more program modules. In particular, the mass storage device 212 and the RAM 206 may store a word processing application 222, a spreadsheet application 224, an e-mail application 226, a calendar application 228, a contact application 230, a synchronizing application 232, imaging application 234, database application 236, etc. As described further below, an association application 238 is preferably included on the computer 200.

Figure 3:
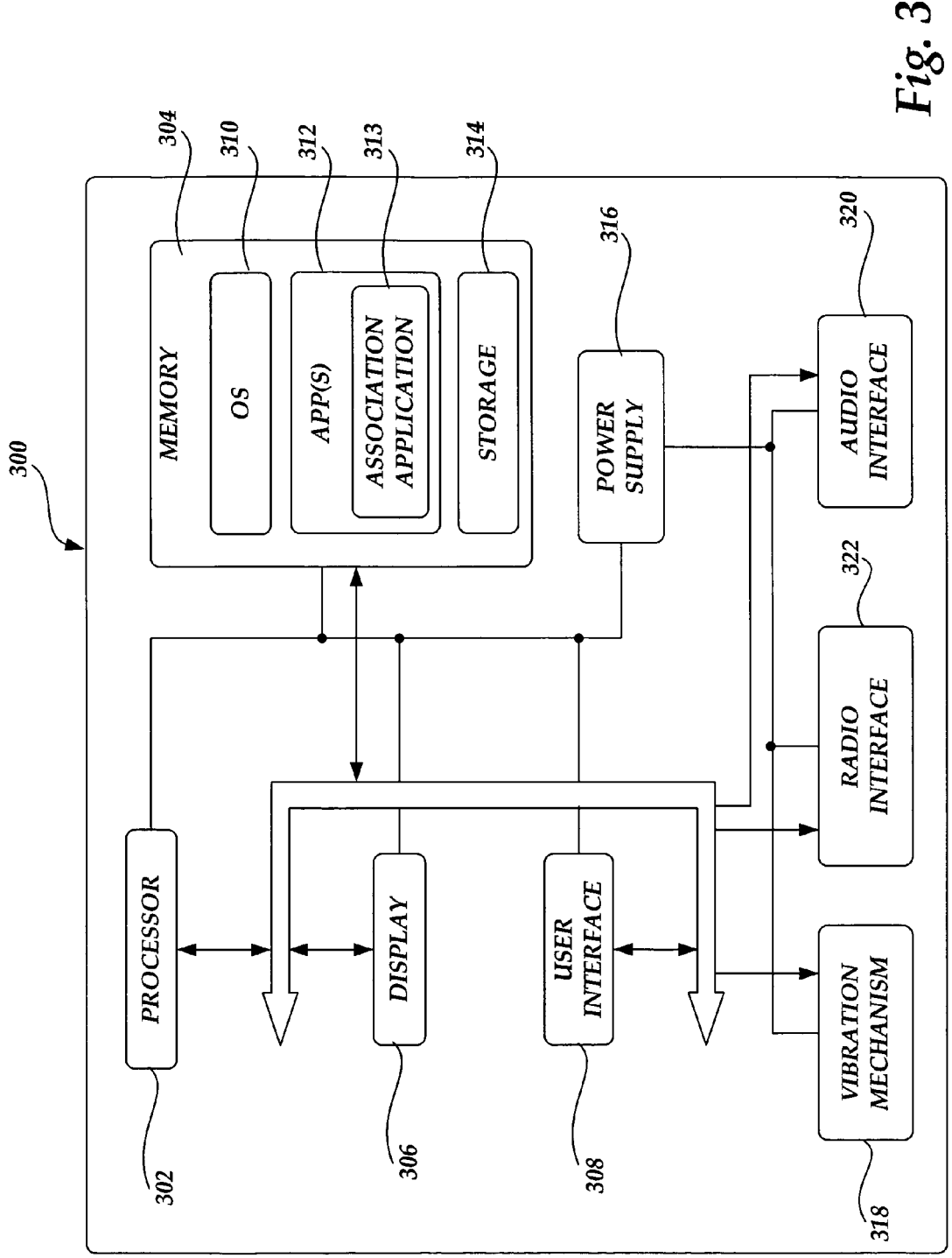
FIG. 3 is a schematic diagram illustrating functional components of an illustrative mobile device for implementation of various embodiments of the present invention.

With additional reference now to FIG. 3, a schematic diagram illustrating functional components of an illustrative mobile device 300 is shown. The mobile device 300 has a processor 302, memory 304, display 306, and a user interface 308. The memory 304 generally includes both volatile memory (e.g., RAM) and non-volatile memory (e.g., ROM, Flash Memory, or the like). The electronic device 300 includes an operating system 310, such as WINDOWS MOBILE operating system from MICROSOFT CORPORATION or another operating system, which is resident in memory 304 and executes on the processor 302. The user interface 308 may be a series of buttons, soft keys, a numeric dialing pad (such as on a typical telephone), or another type of user interface means. The display 306 may be a liquid crystal display, a multiple bit display, or a full color display or any other type of display used in mobile devices. In one example, a touch-sensitive display 306 can be used as an input device.

One or more applications 312 can be loaded into memory 304 and run on the operating system 310. Exemplary applications 312 include phone dialer applications, e-mail applications, word processing applications, spreadsheet applications, database applications, scheduling/calendaring applications, contact applications, task applications, browser applications, and so forth. As described briefly above in conjunction with computer 200, it is also preferred that the mobile device include an association application 313. The mobile device 300 also includes a non-volatile storage 314 that is located within the memory 304. The non-volatile storage 314 may be used to store persistent information which should not be lost if the mobile device 300 is powered down. The applications 312 may use and store information in the storage 314, such as e-mail or other messages used by an e-mail application, contact information used by a PIM, appointment information used by a scheduling program, documents used by a word processing application, and the like.

The mobile device 300 has a power supply 316, which may be implemented as one or more batteries. The power supply 316 might further include an external power source, such as an AC adapter or a powered docking cradle that supplements or recharges the batteries. The docking cradle can also be configured to provide communication between one or more networked computing devices.

The mobile device 300 is also shown with two types of external notification mechanisms: a vibration device 318 and an audio interface 320. These devices may be directly coupled to the power supply 316 so that when activated, they remain on for a duration dictated by the notification mechanism even though the processor 302 and other components might shut down to conserve battery power. The audio interface 320 is used to provide audible signals to and receive audible signals from the user. For example, the audio interface 320 may be coupled to a speaker for providing audible output and to a microphone for receiving audible input, such as to facilitate a telephone conversation, or as a user interface using voice recognition. The vibration device 318 can be used to give feedback to the user such as for alerting the user of a newly arrived message and other information. The mobile device 300 can control each alert mechanism separately (e.g., audio, vibration, as well as visual cues).

The mobile device 300 also includes a radio or wireless interface 322 that performs the function of receiving and/or transmitting communications at certain frequencies, such as radio frequency (RF). The wireless interface 322 facilitates wireless connectivity between the mobile device 300 and other communication devices. Transmissions to and from the wireless interface 322 are conducted under control of the operating system 310 or other controller. In other words, communications received by the wireless interface 322 may be disseminated to applications 312 via the operating system 310, and vice versa.

Figure 4:
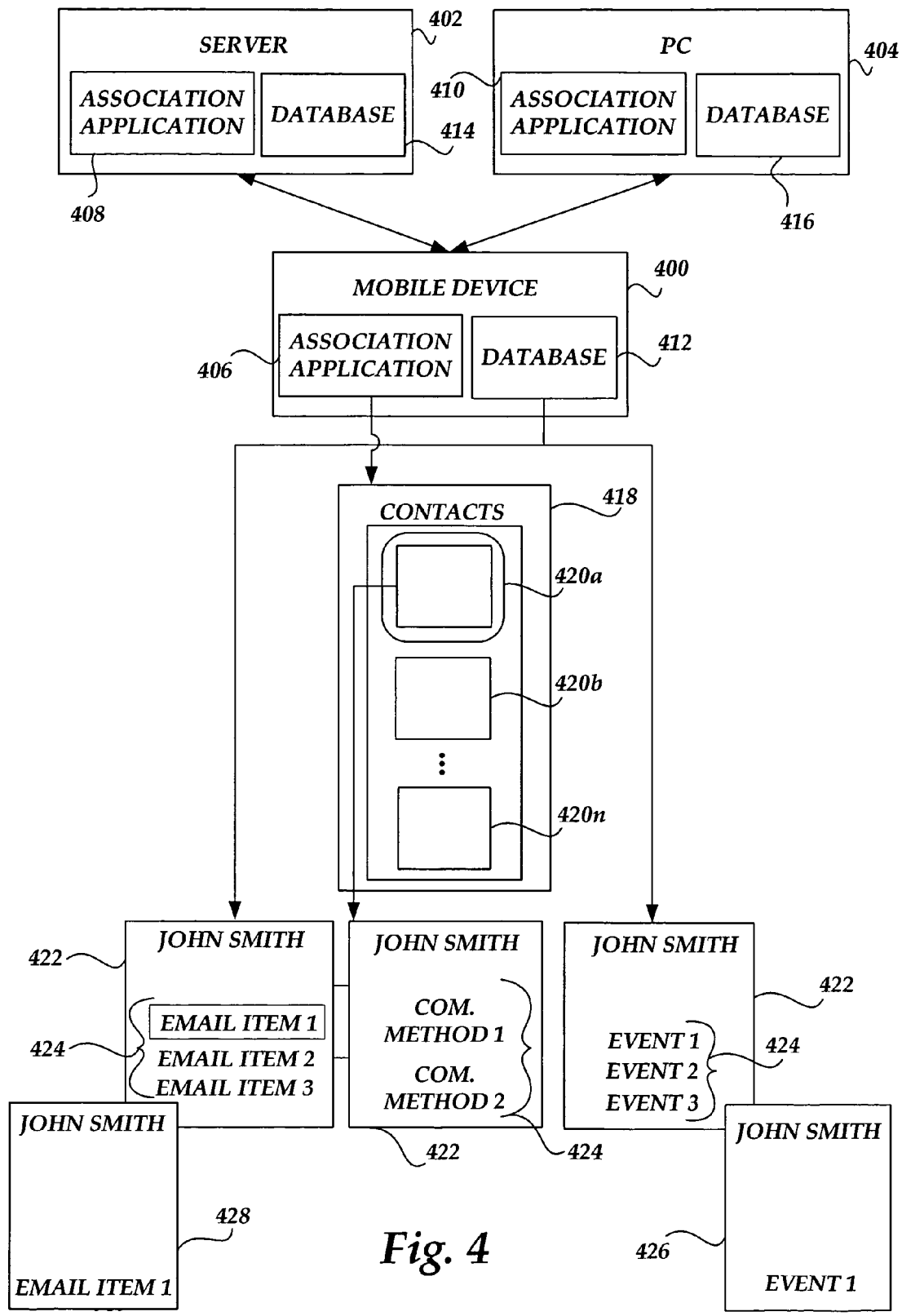
FIG. 4 is a functional block diagram illustrating an embodiment of the invention.

Referring now to FIG. 4, a functional block diagram depicts an embodiment of the invention. As shown in FIG. 4, a mobile device 400 is in communication with a server computer 402 and a desktop or laptop computer 404. As described above, the mobile device 400, server computer 402, and desktop computer 404 include a number of applications. For this embodiment, it is preferred that the mobile device 400, server computer 402, and desktop computer 404 each include an association application: association application 406, 408, and 410, respectively. It is also preferred that the mobile device 400, server computer 402, and desktop computer 404 each include a database application: database application 412, 414, and 416, respectively. However, it will be appreciated that an association and/or database application may only be included in one or more of the computing devices shown, and the invention is not intended to be limited to any specific embodiments or examples described herein.

For this embodiment and to simplify the discussion, the association application and related functionality will be described in conjunction with the mobile device 400 (association application 406). According to the invention, the association application 406 is operable to access, analyze, and associate metadata and other data related to one or more data objects and other information. The association application 406 is operable to recognize various communications, such as e-mails, phone calls, text messaging, etc. and capture the communication information. The data objects and other information, related metadata and other data, can be received and/or reviewed after a synchronization operation, as part of a file transfer, e-mail, or associated with a particular application, such as a calendar application, contact application, etc. Data objects can include various file types, attachments, email, calendar events, notes, music, video, call history, documents, maps, photos, and information related to one or more entities, such as an individual or business contact, hereinafter "contact" or "contacts". Once received, the association application 406 can access the metadata or other data. Alternatively, the association application 406 can remotely access metadata or other data related to one or more data objects or other information from another computer, such as computers 402 and 404, or another mobile device.

After accessing the metadata or other data related to a data object or other information, the association application 406 analyzes the metadata or other data to determine whether the data object or other information is related to a particular contact or contacts. If the association application 406 determines that the data object or other information is related to a contact or contacts, the association application 406 associates the data object with the contact or contacts and/or one or more applications associated with the data object. The association application 406 also operates to store any associations, and provide links or pointers to the related associations, in a central location, such as database 412 or another application file location.

The links or pointers, hereinafter "links" 424, can be accessed and utilized by another program, such as contact application 418. Alternatively, the contact application 418 can include the links 424 as provided by the association application 406. The association application 406 enables a user to utilize one or more associations from the database 412 when using the mobile device 400. Alternatively, a user, using the server computer 402 or desktop computer 404 can utilize the one or more associations from the database 412 through a wireline or wireless link (normally after a synchronization or sync operation). Likewise, a mobile device user can utilize one or more associations from database 414 and/or 416 through a wireline or wireless link.

With continuing reference to FIG. 4, the association application 406 preferably communicates with a contact application 418. As described above, the association application 406 is operable to access, analyze, and associate data objects and related information with one or more contacts. A data object and other information can include metadata and other data which provides a mechanism for the association application 408 to access, analyze, and associate a data object or other information with a contact. For example, when using the mobile device 400, the association application 408 can periodically access, analyze, and associate metadata and other data, such as an e-mail sender, a document author, a meeting attendee, a meeting schedule date, telephone number, e-mail address, IP address, etc. with one or more data objects or other information.

The contact application 418 can include a number of contacts 420a-420n. Each contact 420a-420n preferably includes a contact summary card 422 which can be opened and accessed by a user after opening the contact application 418 and the representative contact 420a-420n. The contact summary card 422 preferably includes links 424 which associate data objects and other information related to a particular contact. It will be appreciated that the association application described herein can be a separate module or integrated into another application, such as contact application 418. The user, using the user interface, can optionally manually associate and store data objects with a contact. As described below, the contact application 418 is also operable to create temporary contact cards for the situation when a communication is received and there is no contact information associated with the communication.

For these situations, it is preferred that the contact application 418 create a temporary contact card which includes extractable information, such as a name, telephone number, e-mail address, etc. and other information which is stored in the temporary card. The user can review the temporary card before making the contact permanent or deleting the temporary card. Permanent contacts are stored in database 412, and thereafter in database 414 or 416, after synchronizing the mobile device 400 and the server computer 402 and/or personal computer 404. It will be appreciated that applications other than a contact application 418 can be used to associate data objects and other information related to a particular contact.

As shown in FIG. 4, contact 420a is associated with "John Smith," an individual contact. The contact summary card 422 associated with John Smith includes links 424 provided by the association application 406. The association application 406 provides the links 424 after accessing, analyzing, and associating data objects and other information with one or more contacts 420a-420n. An example of a link can be a file icon, path, and/or other alphanumeric or symbolic indicator, which leads to the particular data object or other information. Another example of a link can be a hyperlink which, when selected, directs the user to the particular data object or other information, which may stored on the mobile device 400 or at a remote location, such as computers 402 or 404, for example.

As an example, suppose a user receives an e-mail from a supervisor requesting the user to attend a meeting on a certain date. Based on predefined settings, the association application 406 can automatically access and analyze metadata and other data associated with the e-mail. After accessing and analyzing the metadata and other data, the association application 406 can associate the e-mail with a particular contact or contacts and automatically provide a link 424 in the contact card or cards. As another example, suppose a user authors a document and saves the document to server computer 402. Once mobile device 400 syncs with computer 402, the association application 406 can access and analyze metadata or other data associated with the document. After accessing and analyzing the metadata or other data, the association application 406 can associate the document with a particular contact or contacts and automatically provide a link 424 in the contact card or cards. By selecting an appropriate data type from within the contact card (messages, appointments, photos, etc) a user can "pivot" the contact card and see the associated content for that contact. "Pivot" as used herein, refers to a resorting of data associated with a contact in order to view a desired data type. For instance, with reference to FIG. 7B if while viewing a contact summary card 422 for "Maren Jensen" the user wants to see all the related events they have with Maren Jensen the user would select the "Events" Soft Key. The event data associated with Maren Jensen would then populate within the body of the contact summary card 422 as depicted in FIG. 7C.

With reference to FIG. 4, the contact summary card 422 associated with John Smith includes a number of links 424 provided by the association application 406. As described above, the links 424 point to or link various data objects or other information, such as various communication methods, e-mails, events, and other data. Communication methods may include phone numbers, fax numbers, Instant Messaging addresses, Text Messaging (SMS) numbers, etc. E-mails may include e-mail addresses and related information, etc. Events may include calendar, schedule related items, etc. Non-communication data may include photos, music, video, documents, shared tasks, and other information.

Using the contact application 418, the user can "pivot" the contact summary card 422 (as described above) and view/access data objects and other information by selecting a particular link 424. Likewise, the user can view "Event 1" by selecting the link 424 associated with "Event 1" to thereby render the "Event 1" card view 426. The user can view "E-mail Item 1" by selecting the link 424 associated with "E-mail Item 1" to thereby render the "E-mail Item 1" card view 428. Thus, it will be appreciated that embodiments of the invention provide a mechanism for users to find and access information based on the relationships they have with contacts that are associated with various data objects or other information.

Figure 5:
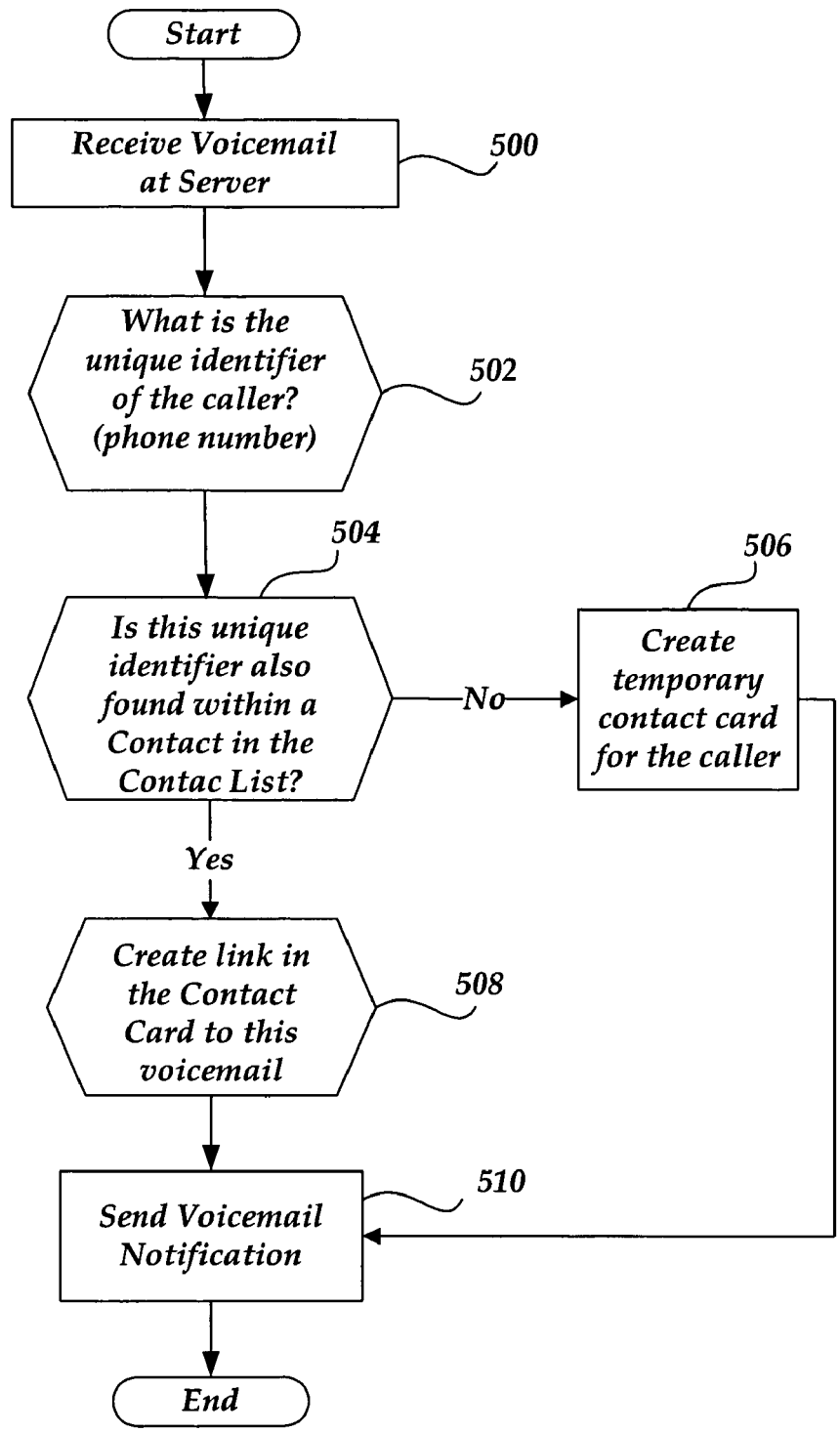
FIG. 5 is a flow diagram depicting an example of a voice-mail association.

Referring now to FIG. 5 and with continuing reference to FIG. 4, a flow diagram provides an example of how a mobile device, such as mobile device 400, associates a voicemail received at a server computer, such as server computer 402. At 500, server computer 402 receives a voicemail. At 502, the association application 408 accesses information related to the voicemail, a unique identifier such as the incoming telephone number, for example. It will be appreciated that the mobile device's association application 406 can also perform the function of association application 408, assuming the mobile device 400 is communicating with the computer server 402. At 504, the association application 408 analyzes the unique identifier to determine if the unique identifier is associated with a contact in the contact application 418. If not, a temporary contact card is created for the caller at 506 and the voicemail notification is sent at 510. If the unique identifier is associated with a contact, at 508 the association application creates a link 424 to the voicemail in the related contact card 422, thereby associating the voicemail with the particular contact. At 510, a voicemail notification is communicated to the user and the flow ends.

Figure 6:
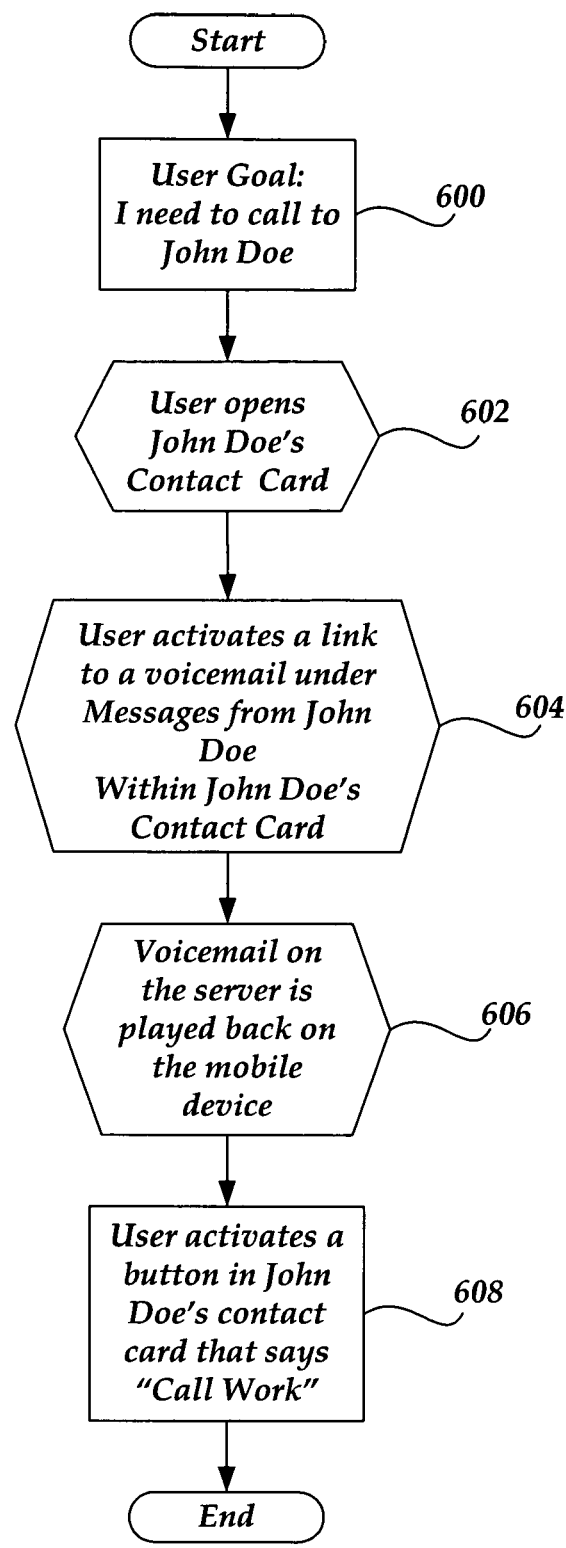
FIG. 6 is a flow diagram depicting an example of a user utilizing an association.

Referring now to FIG. 6 and with continuing reference to FIG. 4, a flow diagram provides an example of a user using a mobile device, such as mobile device 400 to utilize an association. At 600, a user, uses a mobile device 400 with the intention of calling John Doe. At 602, the user, using the contact application 418, opens John Doe's contact card 422. Upon opening the contact card 422, the user realizes that a link 424 associates a voicemail with John Doe and, at 604 the user selects the link 424, by clicking or otherwise. For this example, the voicemail resides on the server computer 402, and the mobile device 400, at 606, can use its resident voicemail application to listen to the voicemail on the server computer 402. After listening to the voicemail, at 608, the user activates a button in the contact card 422 to thereby call John Doe at work.

Figure 7A:
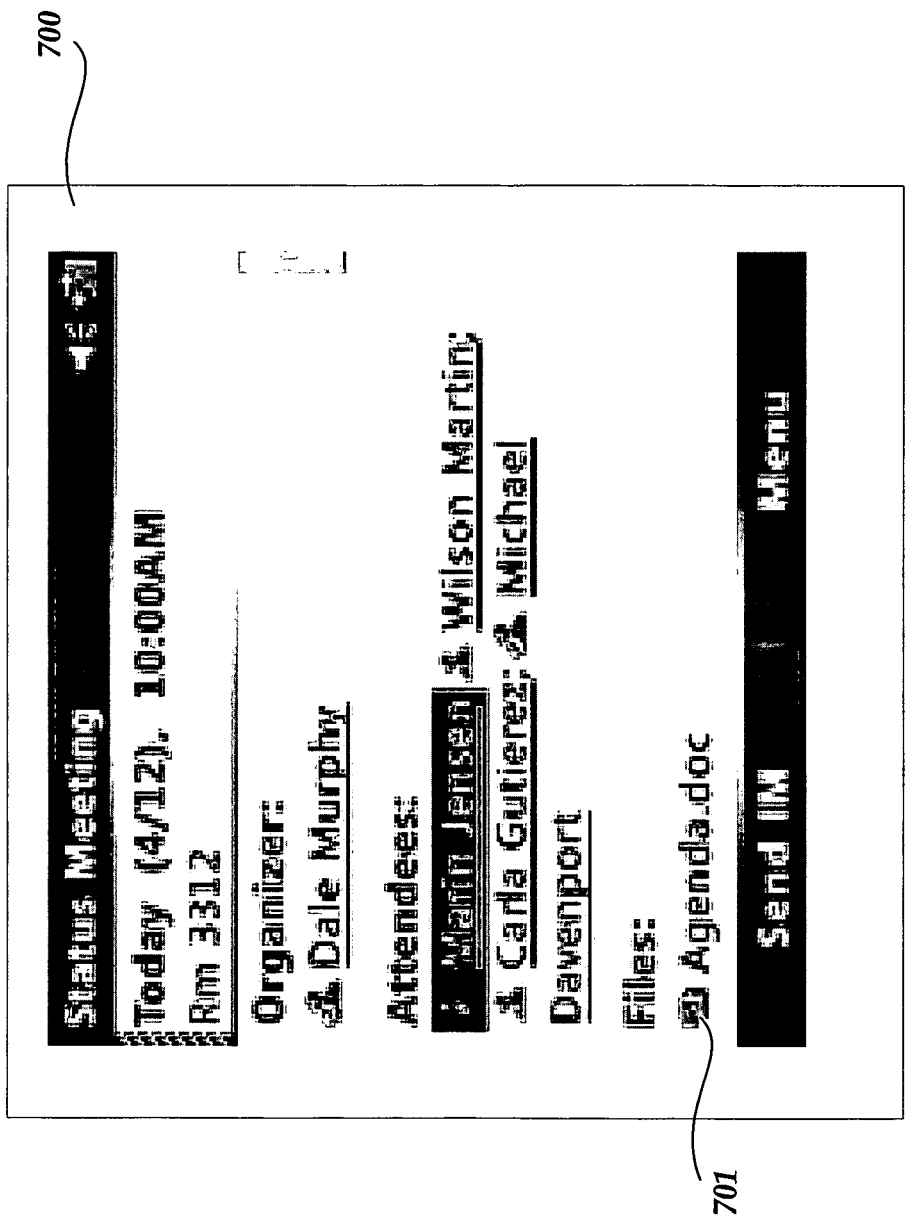
FIGS. 7A-7D depict screen shots of a user using a mobile device and illustrating aspects of the invention.
Figure 7B:
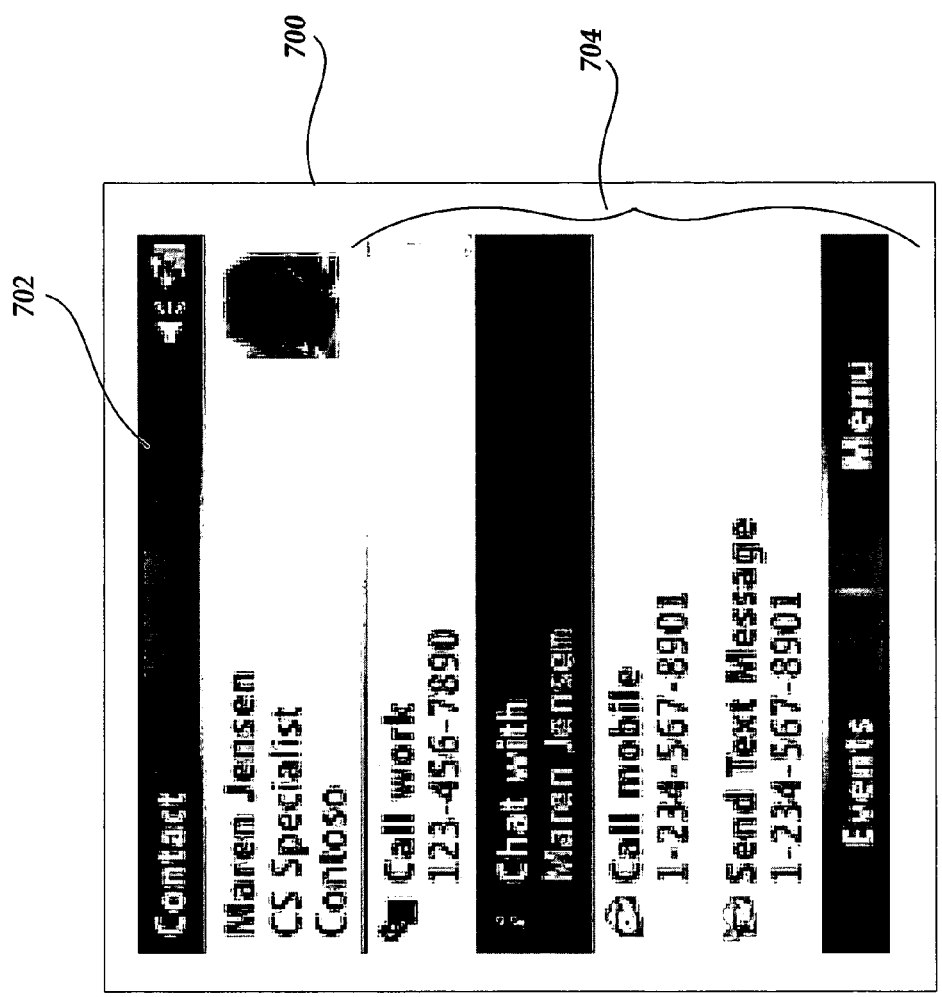
Figure 7C:
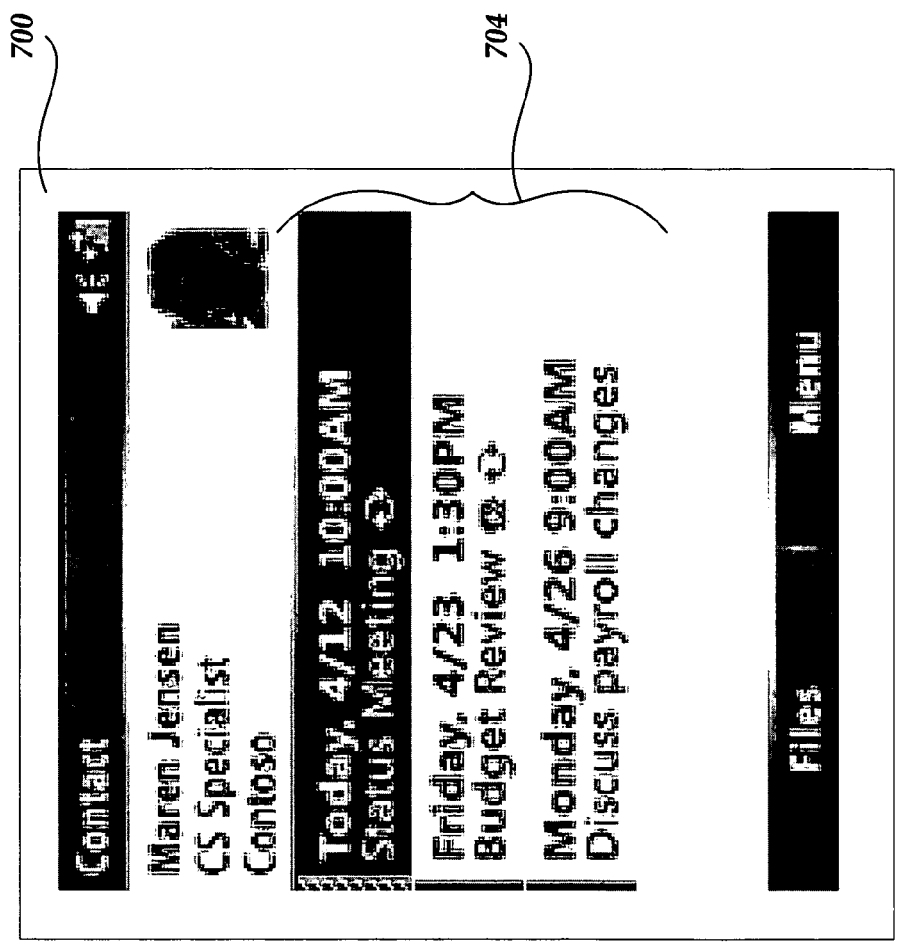

Referring now to FIGS. 7A-7D, a number of screen shots are depicted which illustrate a user using a mobile device 700 in accordance with aspects of the invention. The user has used a synchronization application, such as ACTIVESYNC offered by MICROSOFT CORPORATION, to update the mobile device 700 with various content including calendar, picture, document, communication, e-mail, metadata and other data. As shown in FIG. 7A, a user is viewing a calendar item depicting a meeting with several individuals and a document data object 701. The association application, such as association application 406, has accessed, analyzed, and associated metadata and other data with these individuals and stored links in a database, such as database 412, corresponding to the associated contacts. While viewing the calendar event for the meeting, the user would like to find out if he has a follow-on budget meeting scheduled with one of the attendees and also reference a document he knows the person authored and sent to the user.

Figure 7D:
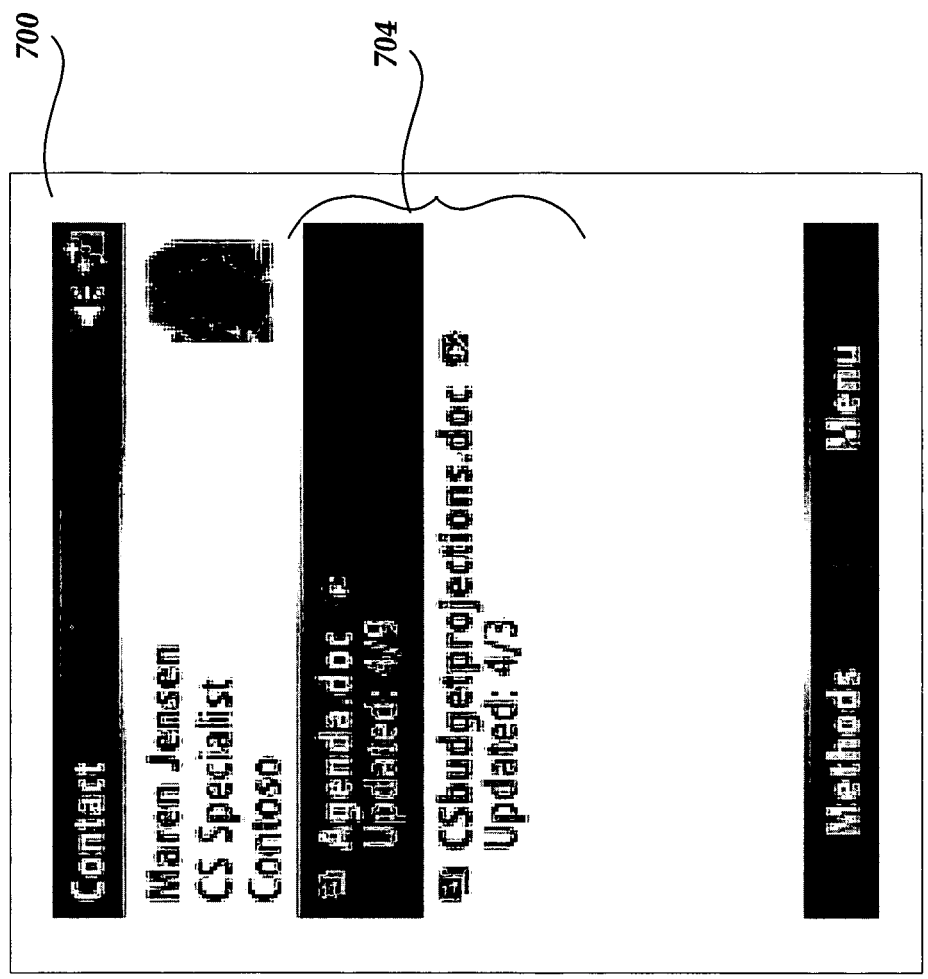

FIG. 7B depicts a screen shot of a contact card 702 after the user has selected "Martin Jensen" from the previous screen. The user is now able to select data objects and other information through the links 704 provided on the contact card 702. By pressing the "soft key" "Events", the user can navigate to another view of the contact card 702, listing links 704 to various events related to the contact as shown in FIG. 7C. If the user presses the "Files" soft key, the device 700 provides another view of the contact card 702, listing links 704 to various data objects (documents for this example) related to the contact as shown in FIG. 7D. The "Menu" soft key provides additional functionality to the user for manipulating items in a view. For example, if the user presses the "Menu" soft key in FIG. 7C, additional functions are displayed, such as an invite option, a delete option, or text messaging for informing attendees with certain information, such as tardiness, cancellation, etc. At each view, the user can select a pointer or ling 704 to utilize a desired target.

It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms making up the embodiments of the present invention described herein are referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A computer-implement method for accessing a stored non-contact based data object and associating the stored non-contact based data object with a contact card, the method comprising:

providing an association application on a computing device, wherein the association application is configured to associate non-contact card data objects of non-contact card applications with a contact card of a contact card application, wherein the association application is configured to access a plurality of data stores that are associated with the non-contact card applications, wherein the non-contact card data objects include a voicemail message, an email message, a calendar event, and a document;

obtaining, by the association application, metadata for the non-contact card data objects, wherein the metadata is analyzed to determine an identifier that indicates a potential contact associated with the non-contact card data object;

determining whether the identifier that indicates the potential contact indicates a contact in a contact card of the contact card application;

when the identifier that indicates the potential contact indicates the contact in the contact card of the contact card application:

generating a selectable link in the contact card to link the non-contact card data object to the contact card, wherein upon selection of the selectable link, the selectable link causes retrieval of the non-contact card data object from the data store and provides functionality of the non-contact card application associated with the non-contact card data object;

when the identifier that indicates the potential contact does not indicate a contact in the contact card of the contact card application:

creating a temporary contact card, automatically populating the temporary contact card with metadata from the non-contact card data object, and providing an option association with the temporary contact card to make the temporary contact card permanent.

2. The computer implemented method of claim 1, wherein the identifier that indicates the potential contact includes at least one member of a group comprising: an email sender identifier, a document author identifier, a meeting attendee identifier, a meeting date identifier, a telephone number, an email address, and an IP address.

3. The computer-implemented method of claim 1, wherein the non-contact card data object includes at least one member of a group comprising: a document associated with a document application, an email associated with an email application, a calendar event associated with a calendar application, a note associated with a note application, a music file associated with a music application, a video file associated with a video application, a call history associated with a phone application, a map associated with a map application, and a photo associated with a photo application.

4. The computer-implemented method of claim 1, wherein the selectable link includes at least one member of a group comprising: a file path and a hyperlink.

5. The computer-implemented method of claim 1, wherein the contact card includes a pivot option, wherein upon selection of the pivot option a list having the selectable link is displayed.

6. The computer-implemented method of claim 5, wherein the pivot option is an events pivot option and the list includes a list of at least one member of a group comprising: a calendar event link associated with the contact and a scheduling event link associated with the contact.

7. The computer-implemented method of claim 5, wherein the pivot option is non-communication document pivot option and the list includes a list of at least one member of a group comprising: a link to a photo file associated with the contact, a link to a music file associated with the contact, a link to a video file associated with the contact, a link to a document file associated with the contact, and a link to a task file associated with the contact.

8. A computer-readable storage medium having computer executable instructions for accessing a stored non-contact card data object and associating the stored non-contact card data object with a contact card, the instructions comprising:
   providing an association application on a computing device, wherein the association application is configured to associate non-contact card data objects of non-contact card applications with a contact card of a contact card application, wherein the association application is configured to access a plurality of data stores that are associated with the non-contact card applications;
   obtaining, by the association application, metadata for the non-contact card data objects, wherein the metadata is analyzed to determine an identifier that indicates a potential contact associated with the non-contact card data object;
   determining whether the identifier that indicates the potential contact indicates a contact in a contact card of the contact card application;
   when the identifier that indicates the potential contact indicates the contact in the contact card of the contact card application, generating a selectable link in the contact card to link the non-contact card data object to the contact card, wherein upon selection of the selectable link, the selectable link causes retrieval of the non-contact card data object from the data store and provides functionality of the non-contact card application associated with the non-contact card data object.

9. The computer-readable storage medium of claim 8, wherein the identifier that indicates the potential contact includes at least one member of a group comprising: an email sender identifier, a document author identifier, a meeting attendee identifier, a meeting date identifier, a telephone number, an email address, and an IP address.

10. The computer-readable storage medium of claim 8, wherein the non-contact card data object includes at least one member of a group comprising: a document associated with a document application, an email associated with an email application, a calendar event associated with a calendar application, a note associated with a note application, a music file associated with a music application, a video file associated with a video application, a call history associated with a phone application, a map associated with a map application, and a photo associated with a photo application.

11. The computer-readable storage medium of claim 8, wherein the selectable link includes at least one member of a group comprising: a file path and a hyperlink.

12. The computer-readable storage medium of claim 8, wherein the contact card includes a pivot option, wherein upon selection of the pivot option a list having the selectable link is displayed.

13. The computer-readable storage medium of claim 12, wherein the pivot option is an events pivot option and the list includes a list of at least one member of a group comprising: a calendar event link associated with the contact and a scheduling event link associated with the contact.

14. The computer-readable storage medium of claim 12, wherein the pivot option is non-communication document pivot option and the list includes a list of at least one member of a group comprising: a link to a photo file associated with the contact, a link to a music file associated with the contact, a link to a music file associated with the contact, a link to a video file associated with the contact, a link to a document file associated with the contact, and a link to a task file associated with the contact.

15. A system for accessing a stored data object and associating the stored data object with a contact card, the system comprising:
   a processor; and
   a memory having computer executable instructions for:
      providing an association application on a computing device, wherein the association application is configured to associate non-contact card data objects of non-contact card applications with a contact card of a contact card application, wherein the association application is configured to access a plurality of data stores that are associated with the non-contact card applications;
      obtaining, by the association application, metadata for the non-contact card data objects, wherein the metadata is analyzed to determine an identifier that indicates a potential contact associated with the non-contact card data object;
      determining whether the identifier that indicates the potential contact indicates a contact in a contact card of the contact card application;
      when the identifier that indicates the potential contact indicates the contact in the contact card of the contact card application, generating a selectable link in the contact card to link the non-contact card data object to the contact card, wherein upon selection of the selectable link, the selectable link causes retrieval of the non-contact card data object from the data store and provides functionality of the non-contact card application associated with the non-contact card data object;
      when the identifier that indicates the potential contact does not indicate a contact in the contact card of the contact card application, automatically populating a temporary contact card with metadata from the non-contact card data object.

16. The system of claim 15, wherein the identifier that indicates the potential contact includes at least one member of a group comprising: an email sender identifier, a document author identifier, a meeting attendee identifier, a meeting date identifier, a telephone number, an email address, and an IP address.

17. The system of claim 15, wherein the non-contact card data object includes at least one member of a group comprising: a document associated with a document application, an email associated with an email application, a calendar event associated with a calendar application, a note associated with a note application, a music file associated with a music application, a video file associated with a video application, a call history associated with a phone application, a map associated with a map application, and a photo associated with a photo application.

18. The system of claim 15, wherein the contact card includes a pivot option, wherein upon selection of the pivot option a list having the selectable link is displayed.

19. The system of claim 18, wherein the pivot option is an events pivot option and the list includes a list of at least one member of a group comprising: a calendar event link associated with the contact and a scheduling event link associated with the contact.

20. The system of claim 18, wherein the pivot option is non-communication document pivot option and the list includes a list of at least one member of a group comprising: a link to a photo file associated with the contact, a link to a music file associated with the contact, a link to a music file associated with the contact, a link to a video file associated with the contact, a link to a document file associated with the contact, and a link to a task file associated with the contact.

* * * * *